(12) United States Patent
Scheckel et al.

(10) Patent No.: US 11,414,334 B2
(45) Date of Patent: Aug. 16, 2022

(54) METHOD FOR SEQUESTERING IONS IN AN ENVIRONMENTAL MATRIX

(71) Applicant: United States Government, as represented by the Administrator of the U.S. EPA, Washington, DC (US)

(72) Inventors: Kirk Gerald Scheckel, Cincinnati, OH (US); Ranju R. Karna, Vicksburg, MS (US); Charles R. Partridge, Commerce City, CO (US); Karen D. Bradham, Apex, NC (US); David James Thomas, Chapel Hill, NC (US); Matthew R. Noerpel, Cincinnati, OH (US); Jennifer Lynn Goetz, Petersburg, KY (US); Todd Peter Luxton, Cincinnati, OH (US)

(73) Assignee: United States Government, as represented by the Administrator of the U.S. EPA, Washington, DC (US)

( * ) Notice: Subject to any disclaimer, the term of this patent is extended or adjusted under 35 U.S.C. 154(b) by 0 days.

(21) Appl. No.: 17/450,445

(22) Filed: Oct. 8, 2021

(65) Prior Publication Data
US 2022/0112110 A1    Apr. 14, 2022

Related U.S. Application Data

(60) Provisional application No. 63/204,529, filed on Oct. 9, 2020.

(51) Int. Cl.
*C02F 9/00* (2006.01)
*B09C 1/08* (2006.01)
(Continued)

(52) U.S. Cl.
CPC .................. *C02F 9/00* (2013.01); *B09B 3/40* (2022.01); *B09C 1/06* (2013.01); *B09C 1/08* (2013.01);
(Continued)

(58) Field of Classification Search
CPC ...... C02F 2101/20; C02F 1/5236; C02F 1/66; C02F 11/008; C02F 1/5245; C02F 1/62;
(Continued)

(56) References Cited

U.S. PATENT DOCUMENTS 4,305,914 A * 12/1981 Pammenter ............... C22B 3/44
423/140
5,569,155 A    10/1996 Pal et al.
(Continued)

FOREIGN PATENT DOCUMENTS

CN    102303041 A    1/2012
CN    106903132 A    6/2017
(Continued)

OTHER PUBLICATIONS

Aguilar-Carrillo et al., "Synergistic arsenic(V) and lead(II) retention on synthetic jarosite. I. Simultaneous structural incorporation behaviour and mechanism" Environmental Science Processes and Impacts, 2018, 20, pp. 354-369 (Year: 2018).*
(Continued)

*Primary Examiner* — Claire A Norris
(74) *Attorney, Agent, or Firm* — McCoy Russell LLP

(57) ABSTRACT

Methods and systems are provided for treating a contaminated environmental medium. In one example, the treatment includes adding a salt to the contaminated environmental medium to form a slurry. The slurry is heated to irreversibly precipitate a jarosite-group mineral incorporating contaminant cations and contaminant anions into its structure.

16 Claims, 6 Drawing Sheets

(51) Int. Cl.
*B09C 1/06* (2006.01)
*B09B 3/40* (2022.01)
*C02F 1/02* (2006.01)
*G21F 9/30* (2006.01)
*C02F 1/66* (2006.01)
*C02F 101/10* (2006.01)
*C02F 101/20* (2006.01)
*C02F 1/52* (2006.01)

(52) U.S. Cl.
CPC ............ *G21F 9/30* (2013.01); *B09C 2101/00* (2013.01); *C02F 1/02* (2013.01); *C02F 1/5236* (2013.01); *C02F 1/66* (2013.01); *C02F 2101/103* (2013.01); *C02F 2101/20* (2013.01)

(58) Field of Classification Search
CPC ............ C02F 2101/103; C02F 2103/10; C02F 2103/16; C02F 9/00; C02F 1/02; G21F 9/30; B09B 3/40; B09C 1/06; B09C 1/08; B09C 1/00; B09C 1/02; B09C 2101/00
USPC ............. 210/717, 737, 912, 749; 405/128.75
See application file for complete search history.

(56) References Cited

U.S. PATENT DOCUMENTS

| | | | | |
|---|---|---|---|---|
| 6,139,753 | A | * | 10/2000 | Taylor .................. C02F 1/64 210/717 |
| 9,982,320 | B2 | | 5/2018 | Liddell et al. |
| 11,173,527 | B2 | | 11/2021 | Lee |
| 2009/0293680 | A1 | * | 12/2009 | Ritchie ............... C22B 15/0089 75/743 |

FOREIGN PATENT DOCUMENTS

| | | |
|---|---|---|
| CN | 105907960 B | 8/2018 |
| CN | 109111021 A | 1/2019 |
| CN | 109292937 A | 2/2019 |
| CN | 110255770 A | 9/2019 |
| CN | 111607401 A | 9/2020 |
| EP | 0090515 A2 | 10/1983 |
| JP | 5905669 B2 | 3/2016 |
| JP | 5905669 B2 | 4/2016 |
| WO | 2007101253 A2 | 9/2007 |
| WO | 2017110964 A1 | 6/2017 |

OTHER PUBLICATIONS

Aguilar-Carrillo et al. "ESI for Synergistic arsenic(V) and lead(II) retention on synthetic jarosite" Environmental Science Processes and Impacts, The Royal Society of Chemistry 2017, pp. 1-16 (Year: 2017).*

Karna, R. et al., "Bioavailable soil Pb minimized by in situ transformation to plumbojarosite," PNAS, vol. 118, No. 3, Dec. 21, 2020, 26 pages.

Kastury, F. et al., "Plumbojarosite formation in contaminated soil to mitigate childhood exposure to lead, arsenic and antimony," Journal of Hazardous Materials, vol. 418, No. 2, Sep. 15, 2021, 12 pages.

Kastury, F. et al., "Plumbojarosite formation in contaminated soil to mitigate childhood exposure to lead, arsenic and antimony," Journal of Hazardous Materials, vol. 418, Sep. 15, 2021, 12 pages.

* cited by examiner

METHOD FOR SEQUESTERING IONS IN AN ENVIRONMENTAL MATRIX

CROSS REFERENCE TO RELATED APPLICATIONS

The present application claims priority to U.S. Provisional Application No. 63/204,529, entitled "METHOD FOR SEQUESTERING IONS IN AN ENVIRONMENTAL MATRIX", and filed on Oct. 9, 2020. The entire contents of the above-listed application are hereby incorporated by reference for all purposes.

ACKNOWLEDGMENT OF GOVERNMENT SUPPORT

This invention was made with government support from the United States Environmental Protection Agency through its Office of Research and Development. The government has certain rights in the invention.

FIELD

The present description relates generally to systems and methods for ion sequestration in environmental matrices.

BACKGROUND AND SUMMARY

Remediation of contaminated environmental media may be costly and demanding of both time and energy. For example, soil may be infiltrated with materials that form cations, such as lead, and/or anions, such as arsenic, when dissolved in soil. Contaminant ions, e.g., cation and anions, present in soil may dissolve in water, thereby increasing mobility and allowing the contaminant ions to enter residential waterways which may lead to widespread health issues. Thus, rapid and effective removal of the contaminant ions or irreversible sequestration is highly desirable.

Conventional treatment of contaminated soils may include physical removal of the soil and replacement with clean soil, which may be slow, expensive, and inefficient and may adversely affect an ecology of a source site of the clean soil. Direct remediation of the soil, either in situ or ex situ, narrows an effect of the treatment to a contaminated medium. For example, a mobility of lead may be decreased by increasing soil pH to promote conversion of lead to a solid phase, such as lead carbonate. However, upon entering a digestive system of an organism, a bioavailability of lead from lead carbonate may remain high due to an increased solubility of lead carbonate when subjected to low stomach pH. Other techniques include lead absorption using materials such as organic matter, clays, metals which similarly reduce mobility but do not sufficiently decrease bioavailability. Phosphate amendments may provide more effective results, driving formation of a lead-phosphate mineral known as pyromorphite. Pyromorphite, however, is sensitive to environmental conditions such as pH, organic matter content, mineral content, and ability of lead to interact with phosphate. As such, results of phosphate amendments demonstrate widely variable results, e.g., from 0-50% reduction in lead bioavailability. Furthermore, excess use of phosphate may drive accumulation of phosphates in waterways which may cause eutrophication. In addition, phosphate amendments do not address removal of other contaminant ions, such as arsenic anions, radionuclides, etc.

In one example, the issues described above may be addressed by a method for treating a contaminated environmental medium, comprising adding a salt to the contaminated environmental medium to form a slurry and heating the slurry to expedite an irreversible precipitation of a jarosite-group mineral incorporating contaminant cations and contaminant anions into a structure of the jarosite-group mineral. In this way, a bioavailability of more than one contaminant ion may be simultaneously minimized via a simple, effective, and low cost process.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
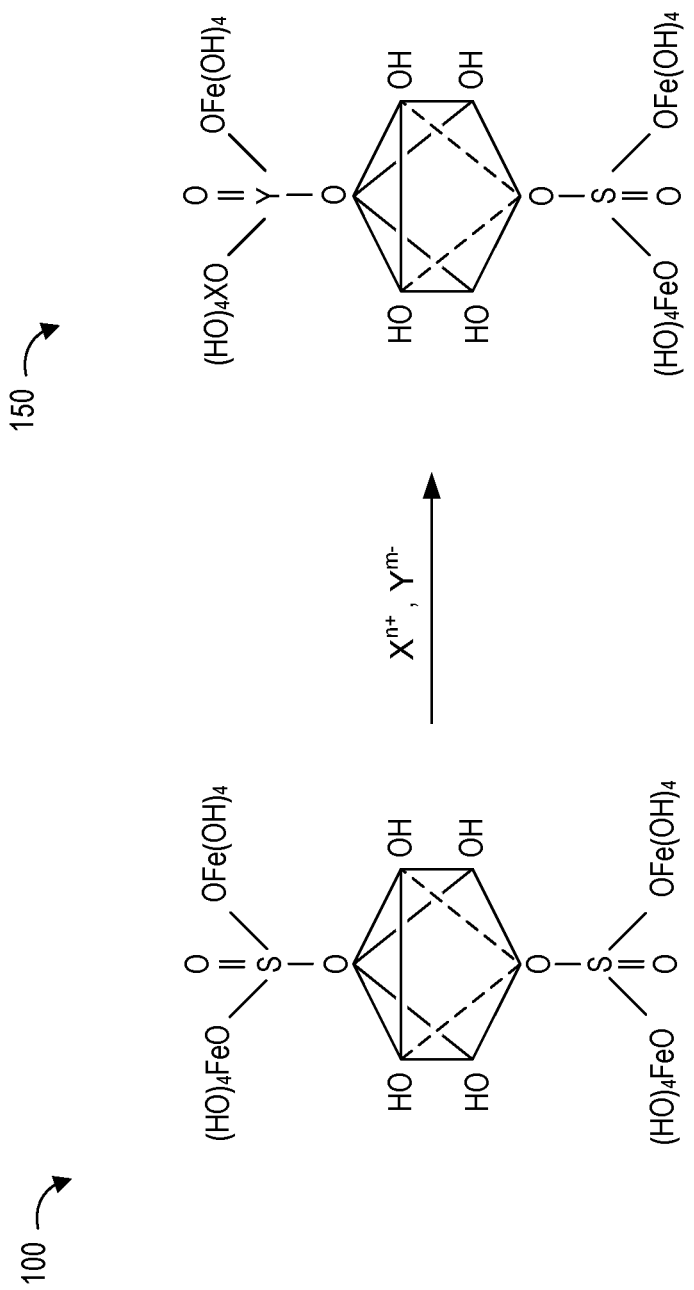
FIG. 1 shows an example of ion substitution into a mineral used to sequester contaminant ions.
Figure 2:
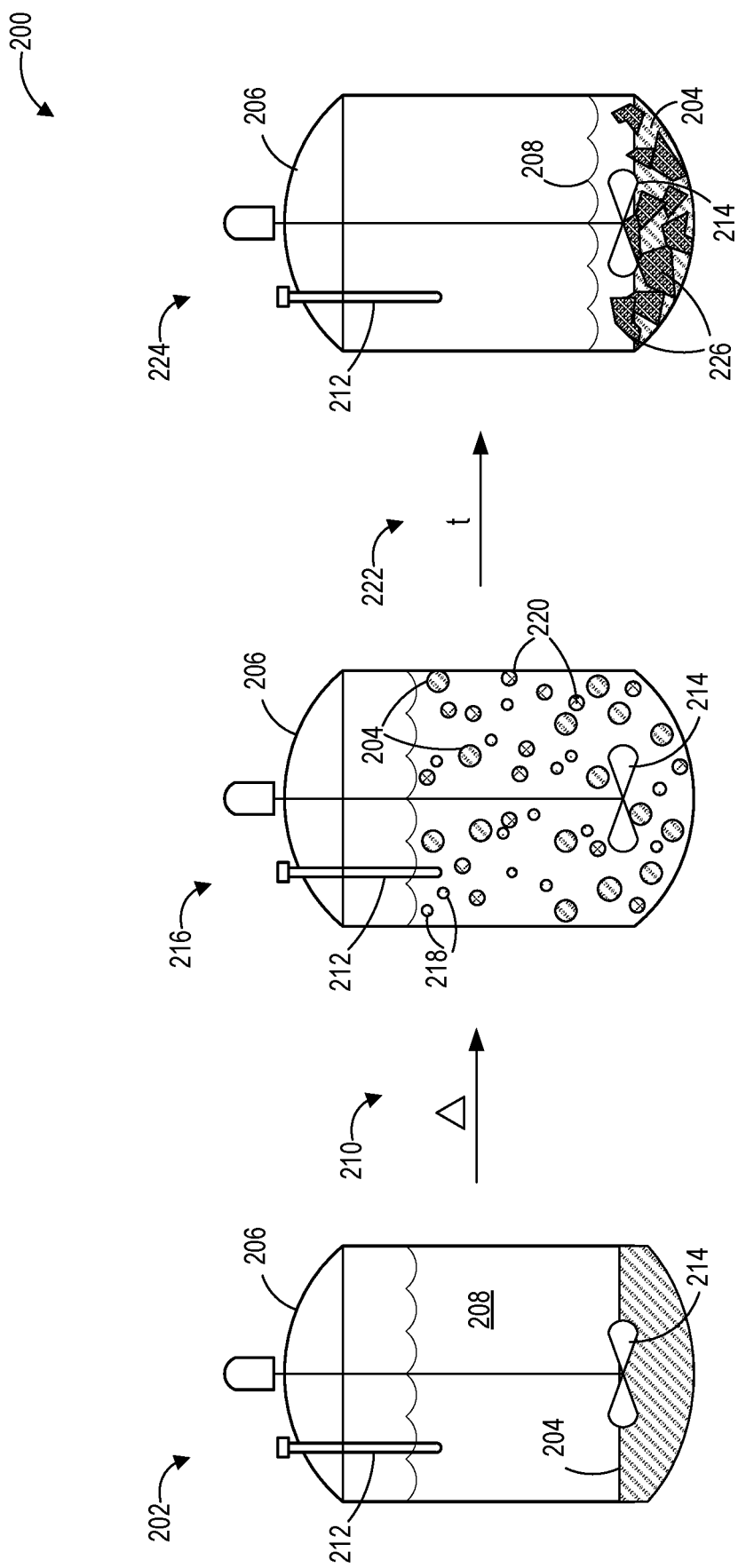
FIG. 2 shows an example of a process for treating contaminated environmental media with a salt precursor of the mineral of FIG. 1.

The following description relates to systems and methods for treating an environmental medium contaminated with water-soluble materials. The contaminated environmental medium may be treated by precipitating a mineral from the medium, the mineral incorporating ions from the contaminant materials into its structure and thereby reducing a mobility and bioavailability of the contaminant ions. In one example, the mineral may have a structure based on jarosite, with a base unit formed of iron cations and sulfate anions. As shown in FIG. 1, the iron and sulfate constituents of the mineral may be at least partially substituted by the contaminant ions upon treatment by a jarosite-group mineral formation process. The process is illustrated in FIG. 2 and described in a flowchart in FIG. 3. Confirmation of the formation of lead-substituted jarosite, e.g., plumbojarosite, is provided by x-ray absorption spectroscopy, as shown in FIG. 4. By forming the contaminant ion-substituted jarosite from the contaminated environmental medium, the contaminant ions may be converted to a non-toxic, environmentally benign species that can sequester one or more types of contaminants. Results of studies examining soil treatment and corresponding bioavailability of lead is depicted by data plotted in FIGS. 4-6, demonstrating an effectiveness of the treatment.

Environmental media at locations used previously or currently for various commercial or recreational applications, such as Superfund sites, residential yards, agricultural land, industrial plants, etc., may be subject to various byproducts of chemical processes that leads to infiltration of undesirable materials such as heavy metals, toxic elements, radioactive compounds, etc. The environmental media may include soils, sediments, and water, which may be challenging to decontaminate efficiently. For example, remedial processes to neutralize biologically and/or ecologically harmful effects of the contaminants may include replacement of the environmental media, or use of various adsorptive and/or chemical techniques to reduce a mobility and bioavailability of the contaminants. As an example, contamination of waterways with lead (Pb) cations may lead to health issues impacting entire communities. Current methods for treating lead contamination exhibit inconsistent and poor outcomes and therefore more robust remedial strategies are demanded.

In one example, a mobility and bioavailability of one or more contaminant ions may be minimized in an environmental medium by treating the medium with a salt to form a naturally occurring mineral. Anionic and cationic sites in the mineral may be substituted by the contaminant ions, thereby sequestering the contaminant ions into a structure of the mineral. In some examples, the substitution may be irreversible or at least nearly irreversible under ambient conditions, reducing the mobility and bioavailability by greater than 99%. The resulting substituted mineral may be resistant to changes in pH, organic matter content, temperature, and pressure, and may be nearly insoluble in aqueous solutions. Thus, even when ingested by the organism, a likelihood of dissolution of the substitute mineral is low, with the contaminant ions tightly bonded within a refractory material that is passed through the organism.

As an example, the salt may be iron sulfate ($Fe_2(SO_4)_3$) and the mineral may be a jarosite derivative, e.g., have a structure analogous to jarosite, such as plumbojarosite. Plumbojarosite is an insoluble lead/iron-hydroxysulfate mineral belong to the alunite supergroup of jarosite-group minerals. However, formation of other mineral types within the alunite supergroup may be possible for sequestering the contaminant ions. For example, alunite may form if aluminum concentration is high, beudantite may form when the environmental medium is contaminated with both lead and arsenic, crandallite may form with addition of phosphate, and formation of florencite, although rarely found in nature, may be possible. However, the jarosite-group minerals may be a most efficient option as their formation may occur even at ambient temperature, albeit slowly.

When heated to above 80° C. to facilitate a formation reaction and to reduce secondary impurities, the jarosite-group minerals may be formed from a solution of iron sulfate, producing a compound with a trigonal crystal structure. Jarosite has a repeating unit of $Fe^{3+}_3(SO_4)_2(OH)_6$ and iron cations ($Fe^{3+}$) may be substituted with other cations while sulfate anions ($SO_4^{2-}$) may be substituted with other anions.

An example of a single unit of jarosite is shown in FIG. 1 by a first chemical structure 100. Other cations, e.g., $X^{n+}$, may at least partially replace the iron cations and other anions e.g., $Y^{m-}$, may at least partially replace the sulfate anions to form a second chemical structure 150, as depicted in FIG. 1. As such, formation of jarosite-group minerals may enable incorporation of more than one type of contaminant ion into the mineral structure, thereby expanding a capability of treatment by jarosite-group mineral formation to decontaminate environmental media. In one example, the other cations include lead cation ($Pb^{2+}$) and the other anions include arsenate ($AsO_4^{3-}$). The second chemical structure 150 may therefore have a basic unit formula such as $PbFe^{3+}_6(OH)_{12}(AsO_4SO_4)_4$, forming plumbojarosite with a low solubility in aqueous solution. It will be appreciated that the second chemical structure 150 shown in FIG. 1 is a representative depiction of one unit of a contaminant-substituted jarosite and other units may vary in composition.

In other examples, various other ions may be similarly incorporated into the jarosite structure. For example, cobalt, nickel, zinc, cadmium, mercury, tungsten, antimony, uranium, and plutonium may at least partially substitute for iron, amongst others, and sulfate may be at least partially substituted by selenite, chromate, antimonite, etc. Numerous, e.g., at least 180, jarosite-group minerals have been identified, enabling a broad application of the remediation strategy described herein. Furthermore, jarosite-group minerals are environmentally and biologically benign materials, therefore effectively suppressing a toxicity, reactivity, mobility, bioavailability, and transport of contaminant ions when formed.

The contaminant ions may be incorporated into a matrix such as a jarosite-group mineral structure during a formation process of the mineral from the salt precursor. The formation process may include treating a mixture formed of the salt precursor and a contaminated environmental medium (e.g., soil, sediment, water, etc.) with water and heat such that contaminants of the environmental medium are converted to their native ionic phases or species to allow substitution of the salt precursor ions by the contaminant ions. An example of a formation process 200 of contaminant-substituted jarosite is illustrated in FIG. 2 by a flow diagram. The formation process is also described by an example of a method 300 for sequestering contaminant ions from environmental media depicted in FIG. 3 and will be discussed in conjunction with the flow diagram of FIG. 2 to elaborate on details of the process and method.

At 302 of method 300, and shown at a first step 202 of the formation process 200 of FIG. 2, a contaminated environmental medium 204 is selected and prepared. For example, selecting the contaminated environmental medium may include identifying a site where levels of contaminants are measured to be above threshold levels, e.g., by laboratory-based soil testing. The threshold levels may be predetermined quantities of the contaminants above which the contaminants are known to have negative effects on organisms and/or a local ecology, as an example. The contaminants, as described above, may include lead, arsenic, and various other elements and compounds.

As shown in FIG. 2, preparing the contaminated environmental medium 204 includes adding the contaminated environmental medium 204 to a batch reactor 206. In one example, the contaminated environmental medium 204 is soil 204 which may be removed from a contaminated site, such as a residential yard. For example, an upper layer of soil from the site, a depth of the upper layer of soil corresponding to a maximum penetration of the contaminants downwards from a surface of the soil, may be extracted and transported from the site to reactor site. The reactor site may be located within close proximity of the soil site, for example, or may be located at a distance demanding travel by a vehicle, such as a truck, to reach the reactor site. The soil 204 may be stored in the batch reactor 206 with water 208. By adding water 208 to the batch reactor 206, water-soluble contaminant compounds in the soil may dissolve to form ions in solution.

At 304 of method 300, the contaminated soil is treated to drive conversion of the contaminant compounds from an ionic phase to a mineral phase. For example, treating the contaminated soil may include heating a mixture, or slurry, formed of the soil, contaminant ions, and water at 306. As shown at a second step 210 of FIG. 2, the batch reactor 206 may be heated by a variety of methods discussed further below, with reference to Table 1. A temperature of the water 208 in the batch reactor 206 may be monitored by, for example, a thermometer or thermocouple 212 and even heat distribution through the water 208 may be enabled by activation of a stirrer 214. The batch reactor 206 may be heated, in one example, to a temperature greater than 80° C. and less than 110° C.

Treating the contaminated soil may also include adding a salt at 308 of method 300. In one example, the salt is iron sulfate. The iron sulfate may be added as a solid or as a solution. For example, the iron sulfate may be dissolved in water before addition or may added in the solid state to be dissolved in the batch reactor 206, as shown in a third step 216 of FIG. 2. The iron sulfate dissolves to produce iron cations 218 and sulfate anions 220. It will be noted that the dissolved contaminant ions are not shown in the batch reactor 206 in the third step 216 for clarity. In some examples, sulfuric acid ($H_2SO_4$) may be added to the batch reactor 206 during the third step 216 to increase a sulfate concentration of the mixture which may drive formation of a jarosite-group mineral, such as plumbojarosite.

Heating and stirring of the mixture may continue for a threshold period of time, as indicated at a fourth step 222 of FIG. 2 and at 309 of method 300. For example, the threshold period of time may be a temperature-dependent duration of time for a reaction resulting in the formation of the jarosite-group mineral to be complete. The reaction may be complete when, for example, greater than 95% of the contaminant ions are incorporated into the jarosite-group mineral structure. As an example, the threshold period of time may be between 5-12 hours, where the threshold period of time decreases as temperature increases.

Figure 3:
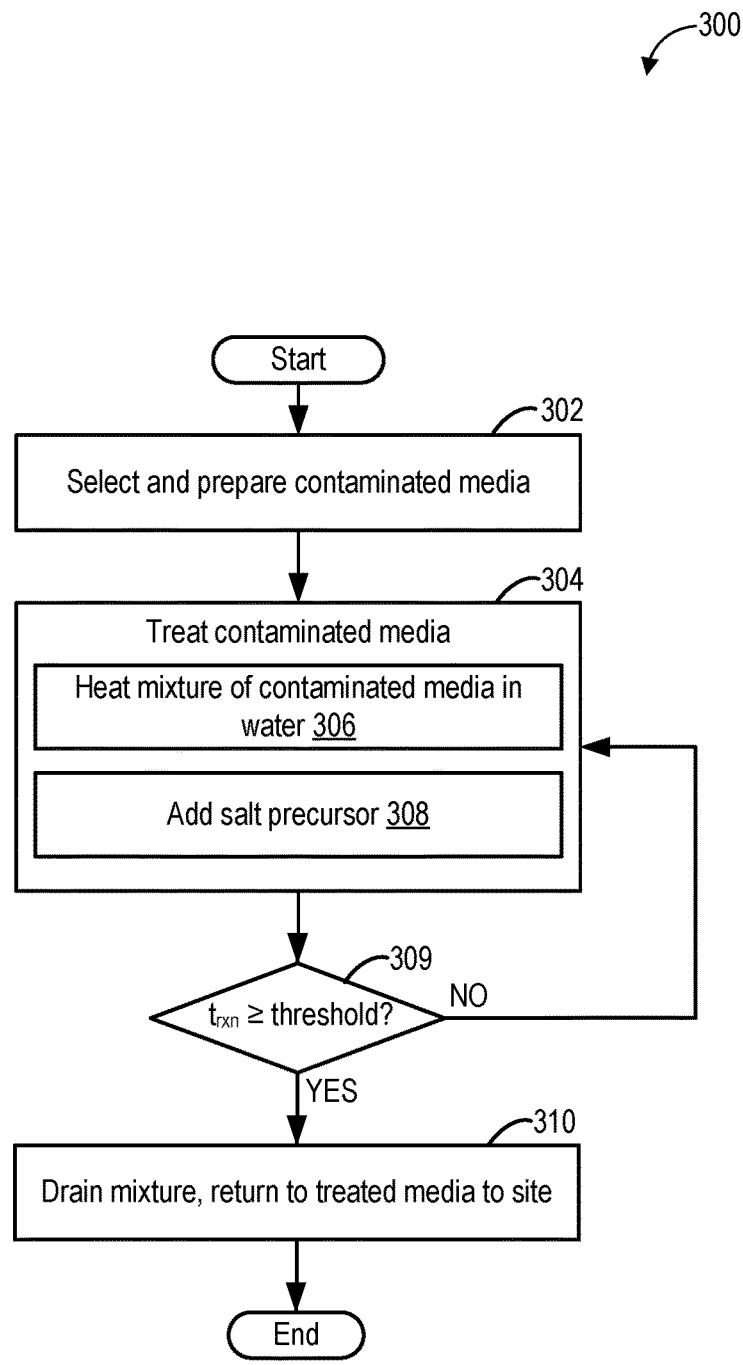
FIG. 3 shows an example of a method for treating contaminated environmental media by incorporating contaminant ions into a mineral matrix.
Figure 4:
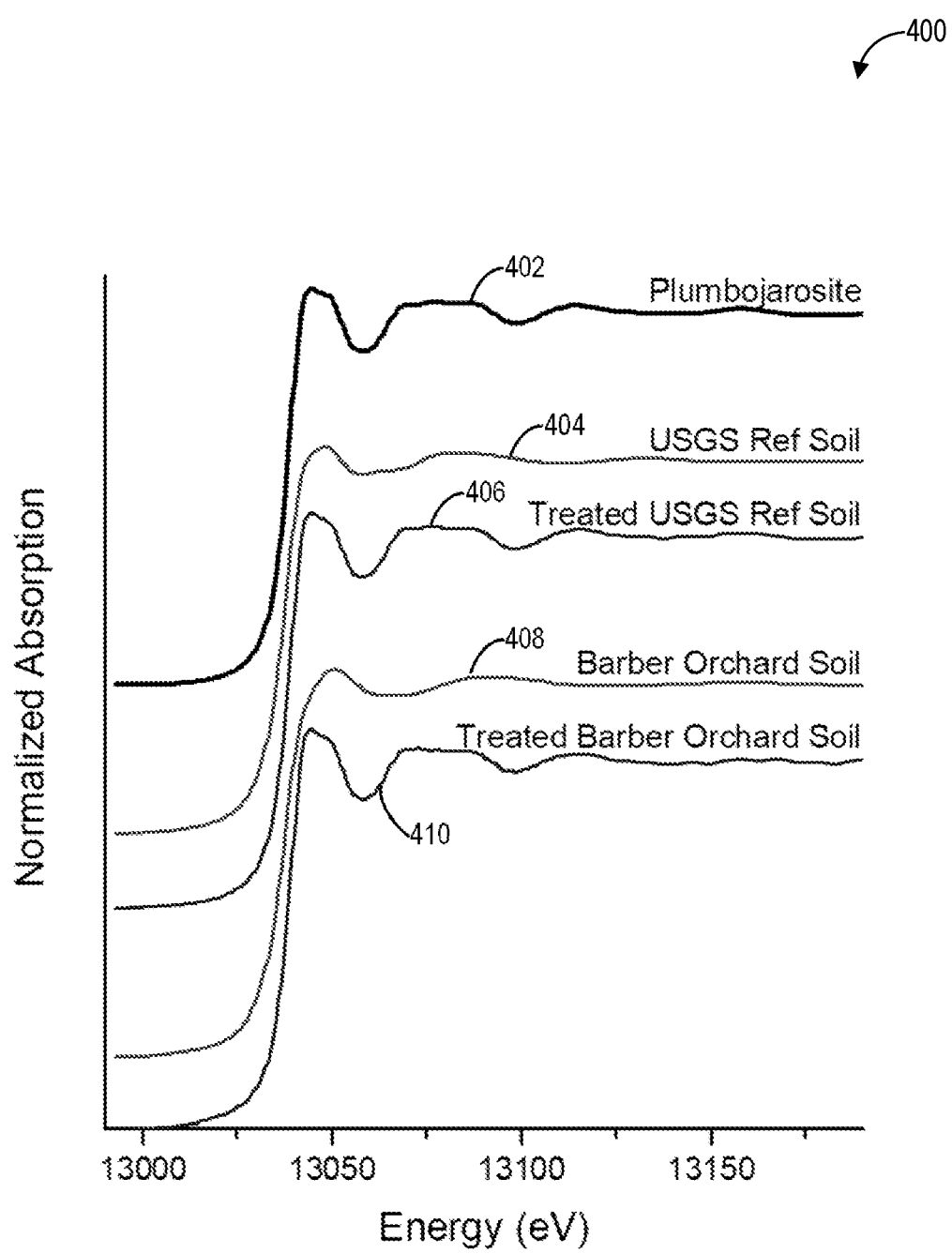
FIG. 4 shows a graph of x-ray absorption spectroscopy data for untreated and treated soil samples.

At 309 of FIG. 3, method 300 includes determining if an amount of time elapsed since a start of the reaction, e.g., a reaction time of the formation process, is at least equal to the threshold period of time. If the time elapsed is less than the threshold period of time, the method returns to 304 to continue treating the contaminated environmental medium via heating and stirring the medium with the salt solution. If the time elapsed is at least equal to the threshold period of time, the method continues to 310 to drain the mixture and return the treated environmental medium to the original site.

For example, as shown as a fifth step 224 of FIG. 2, the reaction may be complete and a jarosite-group mineral structure 226 is formed. The water 208 may be drained, e.g., through a drainage port of the batch reactor 206, and a remaining sediment, formed of the soil 204 and the jarosite-group mineral structure 226 may be removed from the batch reactor 206 and transported back to the original site. The method ends.

In other examples, however, the formation process may be conducted in situ, at the contaminated site. In such instances, the salt may be similarly added as a solid or as a salt solution directly to the soil surface. A heat or steam-generating apparatus may be applied at the soil surface to simultaneously heat the soil and provide water for the reaction, e.g., to facilitate dissolution of the salt and the contaminants. Alternatively, the salt solution may be delivered by direct steam injection into the contaminated soil. The in situ techniques described above, however may demonstrate lower effectiveness than treatment by batch reactor due to heating contact time demands and size constraints of apparatuses used to execute in situ treatment.

Reaction parameters for ion sequestration in an environmental matrix, e.g., a structure of a naturally-occurring mineral such as a jarosite-group mineral, are shown in below in Table 1.

TABLE 1

Reaction parameters for contaminant ion sequestration in a jarosite-based mineral matrix.

| Property/condition | Example Range | Extreme range |
|---|---|---|
| Contaminant media | Soil, sediment, water | Waste, radioactive waste |
| Solid:Solution ratio | 1-100 grams/liter | Up to 350 grams/liter |
| Contaminant concentration | Soil cleanup level to 250x soil cleanup level (mg/kg) | 0 to 1000x soil cleanup level (mg/kg) |
| Target contaminants | Cations: Pb, Co, Ni, Cu, Zn, Cd Anions: As, V, Cr, Se, Sn, Sb, W | Radionuclides: Ce, Th, U, Pu |
| Salt/salt solution | Iron (III) sulfate hydrate [$Fe_2(SO_4)_3$] | Iron (II) sulfate hydrate [$FeSO_4$] |
| Concentration of salt/salt solution | 0.01 to 1M (0.1M optimal) | 1-10M |
| Additive chemical | 0.0001 to 1M $H_2SO_4$ | 1 to 10M $H_2SO_4$ |
| Time | 5 to 12 hours | 1 to 72 hours |
| Heat | >80° C. to <110° C. | >20° C. to <999° C. |
| Heat source | Direct heat source, e.g., direct heating systems, infrared, steam, solar | Alternative heating methods, e.g., microwave, electrical resistivity |

Optimal and extended ranges are depicted for various properties and conditions in Table 1, where the extended ranges are expanded ranges relative to the optimal ranges for a specific parameter. For example, the jarosite-group mineral formation process may primarily be applied to contaminated environmental media such as soil, sediment, and water but may also be used to treat waste materials and radioactive waste. A solid to solution ratio, e.g., an amount of an environmental medium relative to a volume of solution such as water, may be between 1 to 100 grams/liter and as much as 350 grams/liter, in some instances. Increasing the ratio to 400 grams/liter or greater, however, may impede sufficient mixing and suspension of the mixture.

A preferred range for contaminant concentration may include up to a soil cleanup level up to 250 times the soil cleanup level but may be extended from 0 times the soil cleanup level up to 1000 times the soil cleanup level. The soil cleanup level may be a predetermined maximum allowable level of a contaminant in a specific site. For example, a soil cleanup level for lead in residential settings may be 400 mg/kg. Target contaminant species may include heavy metals and elements associated with high toxicity but may also encompass radioactive elements, in some examples.

While iron (III) sulfate hydrate may be used as a salt precursor to jarosite with minimal preparation and/or processing, iron (II) sulfate may also be used which demands an additional oxidation step prior to use. Use of both salts may inherently include intentional additive compounds or impurities such as lithium, sodium, potassium, magnesium, calcium, manganese, silicon, nitrogen, phosphorous, etc. By adding an additive chemical such as sulfuric acid, a pH of the reaction mixture may be reduced and more sulfate may be introduced, driving a forward direction of the jarosite-group mineral formation reaction. As alternatives to sulfuric acid, other sulfate salts may be added instead to increase sulfate concentration, including lithium, sodium, potassium, manganese, and calcium sulfates.

With respect to a duration of time for reaction completion, the preferred range may be between 5 to 12 hours. In some examples, full conversion may occur as fast as one hour but 8 hours may provide a highest likelihood of completion. As such, the extended range for reaction completion may be between 1 and 72 hours, where longer reaction times may correspond to lower reaction temperature. The reaction temperature may be between 80 and 110° C. due to a tendency for lead sulfate to form below 80° C. which has lower stability than plumbojarosite as well as higher bioavailability. In particular, when lead concentration is high, a likelihood of lead sulfate formation may be elevated. Furthermore, above 110° C., water may boil and evaporate and reduce contact between reaction species although loss of water may be offset by implementation of a pressure system. The pressure system may allow heating at elevated temperatures, such as between 110 and 999° C. without loss of solution, therefore favoring plumbojarosite formation and decreasing reaction time. Reaction time may also be decreased by using microwave heating to drive contaminant ion-substituted jarosite.

Formation of plumbojarosite from the reaction described above, with reference to FIGS. 2 and 3, may be confirmed using X-ray absorption spectroscopy (XAS). For example, a graph 400 depicting XAS data for five different samples is shown in FIG. 4. Energy is plotted along the abscissa in electron volts (eV), increasing to the right, and normalized absorption increases upwards along the ordinate. A first plot 402 represents data from plumbojarosite. A second plot 404 represents a first type of soil, including contaminant materials, and a third plot 406 depicts the first type of soil after treatment by formation of a jarosite-group mineral. A fourth plot 408 represents a second type of soil, also including contaminant materials, and a fifth plot 410 depicts the second type of soil after treatment by formation of a jarosite-group mineral. The second plot 404 and the fourth plot 408 each lack distinctive absorption stretches exhibited by the first plot 402. The third plot 406 and the fifth plot 410, however, each display similar profiles to the first plot 402, confirming formation of plumbojarosite. For example, the third and fifth plots 406, 410 each show characteristic extended x-ray absorption fine structure of plumbojarosite (e.g., in the region of 13030-13125 eV).

As described above, a bioavailability of contaminant materials in environmental media may be reduced by sequestering the contaminant materials into the structure of the jarosite-group mineral matrix. An effect of the sequestration may be demonstrated by in-vitro bioassay (IVBA) extractions, as depicted below in Tables 2 and 3. Results for two different soil types (USGS Ref Soil and Barber Orchard) treated by the jarosite-group mineral formation process as well as soil treated instead by a phosphate amendment (Barber Orchard-Phos) are shown. For example, treatment with the phosphate amendment may include addition of phosphate to the soil to induce formation of pyromorphite (e.g., lead phosphate) which is similar in structure to bone materials and has a low bioavailability. However, phosphate and arsenic may have similar chemistries and may compete for similar reaction sites in a soil matrix. For example, the phosphate amendment may cause a phosphate soil concentration to be higher than an arsenic soil concentration, leading to displacement of arsenate from reaction sites in the soil matrix. The displaced arsenic may be mobile and bioavailable as a result. A total amount of lead added to the soils in mg/kg is indicated in a second column of Tables 2 and 3 (e.g., $Pb_{tot}$). A percent lead IVBA extracted from cells is shown according to whether the soil is treated or untreated via the corresponding treatment and according to pH.

TABLE 2

In-vitro bioassay (IVBA) extraction results for lead.

| | | % Pb IVBA | | |
| --- | --- | --- | --- | --- |
| Amended soil sample | $Pb_{tot}$ (mg/kg) | pH 1.5 Untreated | pH 1.5 Treated | pH 2.5 Treated |
| USGS Ref Soil | 6262 | 72 | 0.6 | 0.5 |
| Barber Orchard | 2057 | 75 | 0.3 | 0.2 |
| Barber Orchard-Phos | 2057 | 75 | 49 | 45 |

TABLE 3

In-vitro bioassay (IVBA) extraction results for arsenic.

| | | % As IVBA | | |
| --- | --- | --- | --- | --- |
| Amended soil sample | $As_{tot}$ (mg/kg) | pH 1.5 Untreated | pH 1.5 Treated | pH 2.5 Treated |
| USGS Ref Soil | 640 | 19 | 0.8 | 0.5 |
| Barber Orchard | 308 | 31 | 0.2 | 0.1 |
| Barber Orchard-Phos | 308 | 31 | 42 | 47 |

Turning first to the results for lead shown in Table 2, results for the soils treated by the jarosite-group mineral formation process (USGS Ref Soil and Barber Orchard) show a decrease in % Pb IVBA of 99.2% and 99.6%, respectively, at pH 1.5. The relative reduction in % Pb IVBA is greater at pH 2.5. In comparison, the soil treated by the phosphate amendment shows a decrease in % Pb IVBA of 34.7% at pH 1.5 and 40% at pH 2.5. The results indicate a high efficacy of ion sequestration in the jarosite-group mineral matrix in reducing bioavailability of lead.

The IVBA extractions for arsenic shown in Table 3 display similar results to those shown for lead in Table 2. For example, the soils treated by the jarosite-group mineral formation process show decreases in % As IVBA of at least 95.8% and 99.4% (e.g., at pH 1.5) while the soil treated by the phosphate amendment displays an increase in % As IVBA at both pH 1.5 and 2.5 due to competition for reaction sites between phosphate and arsenic in the soil matrix, as described above. The jarosite-group mineral formation process therefore demonstrates a high capacity for reducing bioavailability of arsenic in addition to lead.

Suppression of contaminant bioavailability may also be indicated by analysis of contaminant accumulation in bones of animal ingesting soils. For example, FIGS. 5 and 6 show bone lead accumulation in animals relative to a total lead consumption derived from a nutritional grain-based diet for rodents, the diet amended with untreated (e.g., contaminated) or treated (e.g., via the jarosite-group mineral formation process) to assess a direct soil ingestion pathway for organisms.

Figure 5:
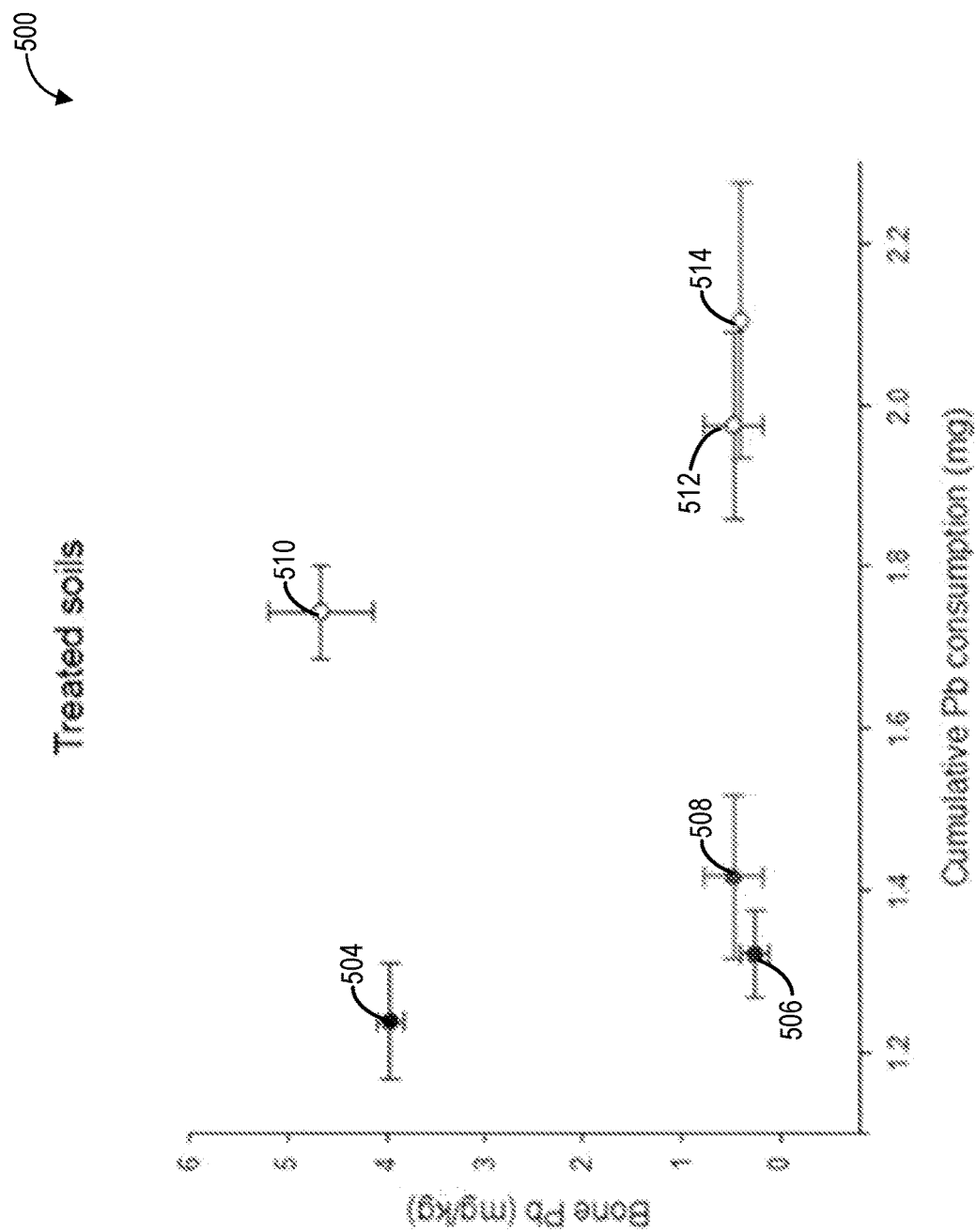
FIG. 5 shows a graph depicting bioaccumulation of lead relative to total lead consumption for treated and untreated contaminated soil samples.

Turning now to FIG. 5, a first graph 500 is shown plotting bone lead accumulation relative to total lead consumption for two types of contaminated soil. The two types of contaminated soil include a pesticide-contaminated soil (BO), represented by solid dots, and a mine-impacted contaminated soil (SOFc), represented by open circles. Data point 504 represents the untreated BO soil and data points 506 and 508 represents the BO soil treated with the jarosite-group mineral formation process after 67 hours and 8 hours, respectively. Data point 510 represents the untreated SOFc soil and data points 512 and 514 represents the SOFc soil treated with the jarosite-group mineral formation process after 67 hours and 8 hours, respectively. While the cumulative lead consumptions for the treated samples appear to be higher than for the corresponding untreated samples, the cumulative lead consumptions may be statistically similar.

The untreated soil samples each demonstrate higher bone accumulation of lead than the corresponding treated samples. For example, the data point 504 corresponds to 4 mg/kg of lead while the data point 510 corresponds to 4.5 mg/kg of lead accumulation in bone. In comparison, the treated samples, for both the BO and SOFc soils, exhibit accumulations of 0.5 mg/kg or less of lead. Furthermore, lead accumulation in bone for the treated samples is similarly low for short (8 hours) and long (67 hours) reaction times.

Figure 6:
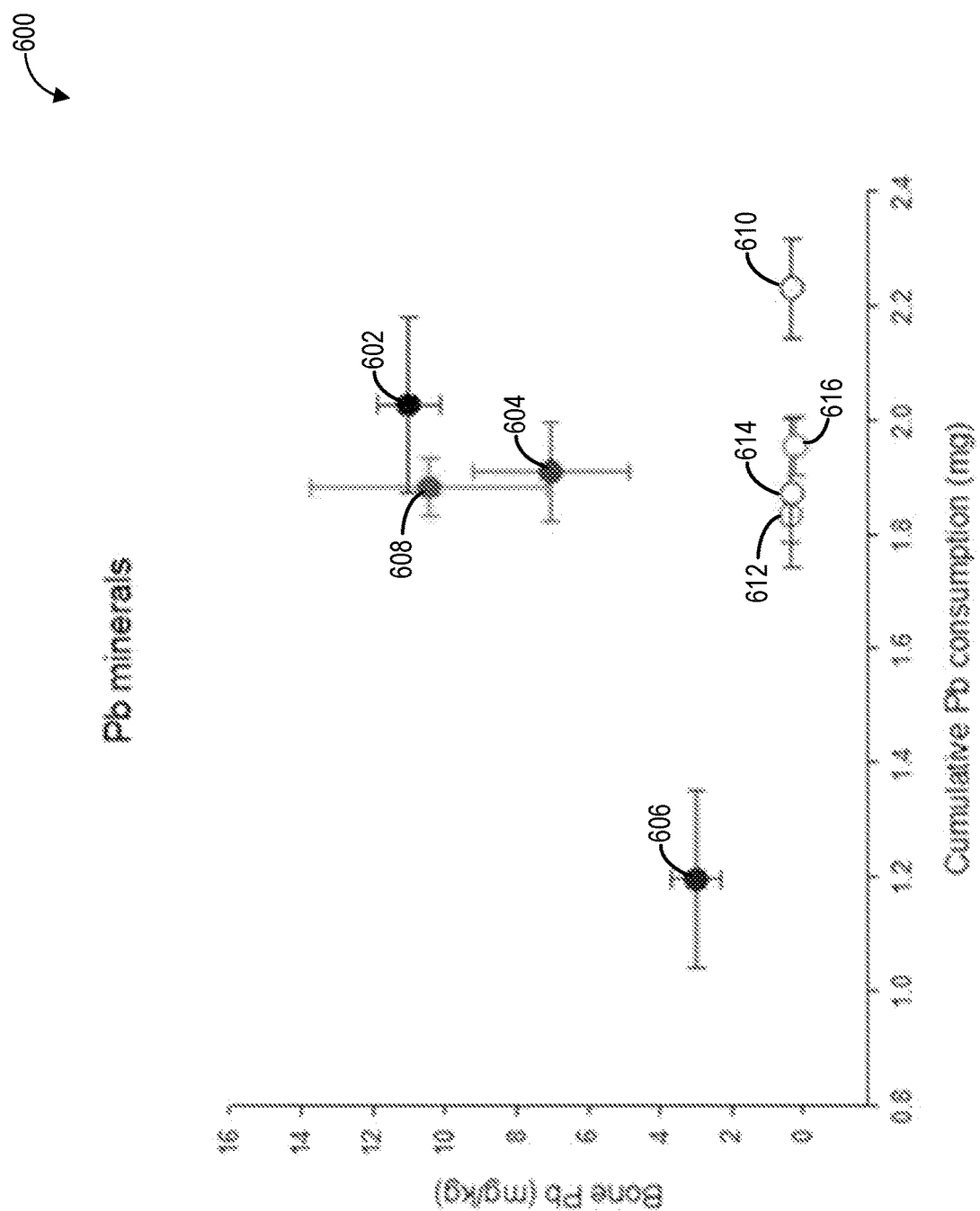
FIG. 6 shows a graph depicting bioaccumulation of lead relative to total lead consumption for different lead minerals amended into clean soil.

Similar results are shown in FIG. 6. Therein, a second graph 600 is depicted, plotting bone lead accumulation relative to total lead consumption for a series of soils spiked with a type of lead mineral, including lead carbonate (shown by data points 602 and 610), lead chloride (shown by data points 604 and 612), lead phosphate (shown by data points 606 and 614), and lead sulfate (shown by data points 608 and 616). For example, each soil sample of the series of soils is derived from a common soil source and the soil sample is spiked with one type of lead mineral and split into portions to be used to compare one more treated portions to an untreated portion. Thus, each of the series of lead minerals include untreated (indicated by shaded circles) samples and samples treated for 67 hours with the jarosite-group mineral formation process (indicated by open circles). The untreated samples demonstrate bone accumulations of lead between 2.5-11 mg/kg while the treated samples show bone accumulations of lead of less than 1 mg/kg. Thus, regardless of a type of lead precursor, the treatment by jarosite-group mineral formation consistently reduces a bioavailability of lead.

In this way, remediation of contaminated environmental media may be achieved via a fast, low cost, and effective technique. Contaminant materials, forming ions in aqueous solution, may be converted to a nontoxic, environmentally benign phase by incorporating the ions into a structure of a jarosite-group mineral. The jarosite-group mineral may simultaneously sequester more than one type of ion, including ions derived from materials associated with high toxicity, adverse ecological/environmental effects, and radioactive properties. As such, remediation efficiency may be increased for sites contaminated with a variety of materials by application of a single process.

The disclosure also provides support for a method for treating a contaminated environmental medium, comprising: adding a salt to the contaminated environmental medium to form a slurry and heating the slurry to expedite an irreversible precipitation of a jarosite-group mineral incorporating contaminant cations and contaminant anions into a structure of the jarosite-group mineral. In a first example of the method, incorporating the contaminant cations includes incorporating lead cations into the structure of the jarosite-group mineral and wherein the jarosite-group mineral is plumbojarosite. In a second example of the method, optionally including the first example, incorporating the contaminant anions includes incorporating arsenate anions into the structure of the plumbojarosite and wherein the arsenate anions are incorporated simultaneously with the lead cations. In a third example of the method, optionally including one or both of the first and second examples, adding the salt to the contaminated environmental medium includes adding iron sulfate as one of a solid salt or a salt solution. In a fourth example of the method, optionally including one or more or each of the first through third examples, heating the slurry includes heating the slurry to a temperature between 80 and 110° C. when the slurry is at atmospheric pressure. In a fifth example of the method, optionally including one or more or each of the first through fourth examples, heating the slurry includes heating the slurry to a temperature up to 999° C. when the slurry is at higher than atmospheric pressure. In a sixth example of the method, optionally including one or more or each of the first through fifth examples, heating the slurry includes heating the slurry for a duration of time between 1 to 12 hours. In a seventh example of the method, optionally including one or more or each of the first through sixth examples, adding the salt to the contaminated environmental medium includes adding the salt to one or more of soil, sediment, water, waste, and radioactive waste. In an eighth example of the method, optionally including one or more or each of the first through seventh examples, forming the slurry includes transporting the contaminated environmental medium from a contamination site to a batch reactor and wherein the adding of the salt and the heating of the slurry is performed at the batch reactor. In a ninth example of the method, optionally including one or more or each of the first through eighth examples, forming the slurry includes one of adding the salt to the contaminated environmental medium in situ at a contamination site and using a steam-generating apparatus to add heat and water to the contaminated environmental medium or using direct steam injection to inject a salt solution, the salt solution including the salt, into the contaminated environmental medium in situ at the contamination site.

The disclosure also provides support for a method for treating a site of contamination, comprising: extracting a medium from the site and forming a slurry with the medium in water at a batch reactor, the slurry including dissolved contaminant ions, adding an iron sulfate source to the slurry and heating the slurry, precipitating a jarosite-group mineral based on interaction between the contaminant ions and the sulfate source, and returning the medium with the jarosite-group mineral to the site. In a first example of the method, forming the slurry includes forming the slurry with a medium-to-water ratio of up to 350 grams/liter. In a second example of the method, optionally including the first example, extracting the medium from the site includes extracting the medium with a contaminant concentration of up to 1000 times a threshold level of the contaminant in the medium and wherein adverse health and/or environmental effects are associated with contaminant concentrations above the threshold level of the contaminant. In a third example of the method, optionally including one or both of the first and second examples, adding the iron sulfate source includes adding one or more of iron (III) sulfate hydrate and iron (II) sulfate hydrate and wherein the iron sulfate source is added at a concentration between 0.01 to 10 M. In a fourth example of the method, optionally including one or more or each of the first through third examples, heating the slurry includes one of heating the slurry between 80 and 110° C. when the slurry is at atmospheric pressure or heating the slurry to a temperature up to 999° C. when the slurry is at higher than atmospheric pressure. In a fifth example of the method, optionally including one or more or each of the first through fourth examples, the method further comprises: adding an additive chemical to the slurry while heating to reduce a pH and increase a sulfate concentration of the slurry and wherein the additive chemical is one or more of sulfuric acid, lithium sulfate, sodium sulfate, potassium sulfate, magnesium sulfate, calcium sulfate, and manganese sulfate. In a sixth example of the method, optionally including one or more or each of the first through fifth examples, heating the slurry includes adding heat via one of a direct heating system, infrared heating, steam heating, solar-based heating, electrical resistivity, and microwave heating.

The disclosure also provides support for a system for decontaminating an environmental medium, comprising: a batch reactor configured to enable precipitation of a jarosite-group mineral from a slurry, wherein the slurry is formed from a contaminated environmental medium and a sulfate salt. In a first example of the system, the precipitation of the jarosite-group mineral converts contaminants of the contaminated environmental medium from ions with high bioavailability to constituents of the jarosite-group mineral with low bioavailability. In a second example of the system, optionally including the first example, a reduction in bioavailability of the contaminants is greater than 90% when the jarosite-group mineral is precipitated.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for treating a contaminated environmental medium, comprising:
adding a salt to the contaminated environmental medium to form a slurry and heating the slurry to expedite an irreversible precipitation of a jarosite-group mineral incorporating contaminant cations and contaminant anions into a structure of the jarosite-group mineral wherein forming the slurry includes adding the salt to the contaminated environmental medium in situ at a contamination site.

2. The method of claim 1, wherein incorporating the contaminant cations includes incorporating lead cations into the structure of the jarosite-group mineral and wherein the jarosite-group mineral is plumbojarosite.

3. The method of claim 2, wherein incorporating the contaminant anions includes incorporating arsenate anions into the structure of the plumbojarosite and wherein the arsenate anions are incorporated simultaneously with the lead cations.

4. The method of claim 1, wherein adding the salt to the contaminated environmental medium includes adding iron sulfate as one of a solid salt or a salt solution.

5. The method of claim 1, wherein heating the slurry includes heating the slurry to a temperature between 80 and 110° C. when the slurry is at atmospheric pressure.

6. The method of claim 1, wherein heating the slurry includes heating the slurry to a temperature up to 999° C. when the slurry is at higher than atmospheric pressure.

7. The method of claim 1, wherein heating the slurry includes heating the slurry for a duration of time between 1 to 12 hours.

8. The method of claim 1, wherein adding the salt to the contaminated environmental medium includes adding the salt to one or more of soil, sediment, water, waste, and radioactive waste.

9. The method of claim 1, further comprising one of using a steam-generating apparatus to add heat and water to the contaminated environmental medium or using direct steam injection to inject a salt solution, the salt solution including the salt, into the contaminated environmental medium in situ at the contamination site.

10. A method for treating a site of contamination, comprising:
extracting a medium from the site and forming a slurry with the medium in water at a batch reactor, the slurry including dissolved contaminant ions;
adding an iron sulfate source to the slurry and heating the slurry;
precipitating a jarosite-group mineral based on interaction between the contaminant ions and the sulfate source; and
returning the medium with the jarosite-group mineral to the site.

11. The method of claim 10, wherein forming the slurry includes forming the slurry with a medium-to-water ratio of up to 350 grams/liter.

12. The method of claim 10, wherein extracting the medium from the site includes extracting the medium with a contaminant concentration of up to 1000 times a threshold level of the contaminant in the medium and wherein adverse health and/or environmental effects are associated with contaminant concentrations above the threshold level of the contaminant.

13. The method of claim 10, wherein adding the iron sulfate source includes adding one or more of iron (III) sulfate hydrate and iron (II) sulfate hydrate and wherein the iron sulfate source is added at a concentration between 0.01 to 10 M.

14. The method of claim 10, wherein heating the slurry includes one of heating the slurry between 80 and 110° C. when the slurry is at atmospheric pressure or heating the slurry to a temperature up to 999° C. when the slurry is at higher than atmospheric pressure.

15. The method of claim 10, further comprising adding an additive chemical to the slurry while heating to reduce a pH and increase a sulfate concentration of the slurry and wherein the additive chemical is one or more of sulfuric acid, lithium sulfate, sodium sulfate, potassium sulfate, magnesium sulfate, calcium sulfate, and manganese sulfate.

16. The method of claim 10, wherein heating the slurry includes adding heat via one of a direct heating system, infrared heating, steam heating, solar-based heating, electrical resistivity, and microwave heating.

* * * * *